United States Patent
Dugan et al.

(10) Patent No.: US 12,008,243 B2
(45) Date of Patent: Jun. 11, 2024

(54) REDUCING INDEX UPDATE MESSAGES FOR MEMORY-BASED COMMUNICATION QUEUES

(71) Applicant: Micron Technology, Inc., Boise, ID (US)

(72) Inventors: Michael Keith Dugan, Richardson, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 17/979,390

(22) Filed: Nov. 2, 2022

(65) Prior Publication Data
US 2024/0143184 A1    May 2, 2024

(51) Int. Cl.
*G06F 3/06* (2006.01)

(52) U.S. Cl.
CPC .......... *G06F 3/0616* (2013.01); *G06F 3/0659* (2013.01); *G06F 3/0673* (2013.01)

(58) Field of Classification Search
CPC ....................................................... G06F 3/06
See application file for complete search history.

(56) References Cited

U.S. PATENT DOCUMENTS

| 11,055,176 B1* | 7/2021 | Helmick | G06F 3/0619 |
| 2015/0046605 A1* | 2/2015 | Barrell | G06F 3/0689 |
| | | | 710/5 |

* cited by examiner

*Primary Examiner* — Khoa D Doan
(74) *Attorney, Agent, or Firm* — Schwegman Lundberg & Woessner, P.A.

(57) ABSTRACT

A system includes a host device, a memory device, and a command manager configured to reorder respective command responses for corresponding commands between the host device and the memory device. The command manager is further configured to receive a command response associated with a transaction identifier for each command. An index value for the command is written to a reordering queue. In response to a command response write for the command response, the index value from the reordering queue is read. The index value is written in an index update queue. A network write index update message is transmitted.

20 Claims, 5 Drawing Sheets

REDUCING INDEX UPDATE MESSAGES FOR MEMORY-BASED COMMUNICATION QUEUES

STATEMENT REGARDING FEDERALLY SPONSORED RESEARCH OR DEVELOPMENT

This invention was made with Government support under Agreement No. DE-AC05-76RL01830, awarded by the US Department of Energy. The Government has certain rights in the invention.

TECHNICAL FIELD

Embodiments pertain to memory devices. Some embodiments pertain to access request reordering in memory devices.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In some examples, non-volatile memory media may be used to build a system with a persistent memory model.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

Various protocols or standards can be applied to facilitate communication between a host and one or more other devices such as memory buffers, accelerators, or other input/output devices. In an example, an unordered protocol such as Compute Express Link (CXL) can be used to provide high-bandwidth and low-latency connectivity.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Compute Express Link (CXL) is an open standard interconnect configured for high-bandwidth, low-latency connectivity between host devices and other devices such as accelerators, memory buffers, and smart I/O devices. CXL was designed to facilitate high-performance computational workloads by supporting heterogeneous processing and memory systems. CXL enables coherency and memory semantics on top of PCI Express (PCIe)-based I/O semantics for optimized performance.

In some examples, CXL is used in applications such as artificial intelligence, machine learning, analytics, cloud infrastructure, edge computing devices, communication systems, and elsewhere. Data processing in such applications can use various scalar, vector, matrix and spatial architectures that can be deployed in CPU, GPU, FPGA, smart NICs, and other accelerators that can be coupled using a CXL link.

CXL supports dynamic multiplexing using a set of protocols that includes input/output (CXL.io, based on PCIe), caching (CXL.cache), and memory (CXL.memory) semantics. In an example, CXL can be used to maintain a unified, coherent memory space between the CPU (e.g., a host device or host processor) and any memory on the attached CXL device. This configuration allows the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL runs on PCIe PHY and provides full interoperability with PCIe. In an example, a CXL device starts link training in a PCIe Gen 1 Data Rate and negotiates CXL as its operating protocol (e.g., using the alternate protocol negotiation mechanism defined in the PCIe 5.0 specification) if its link partner is capable of supporting CXL. Devices and platforms can thus more readily adopt CXL by leveraging the PCIe infrastructure and without having to design and validate the PHY, channel, channel extension devices, or other upper layers of PCIe.

In an example, CXL supports single-level switching to enable fan-out to multiple devices. This enables multiple devices in a platform to migrate to CXL, while maintaining backward compatibility and the low-latency characteristics of CXL.

In an example, CXL can provide a standardized compute fabric that supports pooling of multiple logical devices (MLD) and single logical devices such as using a CXL switch connected to several host devices or nodes (e.g., Root Ports). This feature enables servers to pool resources such as accelerators and/or memory that can be assigned according to workload. For example, CXL can help facilitate resource allocation or dedication and release. In an example, CXL can help allocate and deallocate memory to various host devices according to need. This flexibility helps designers avoid over-provisioning while ensuring best performance.

Some of the compute-intensive applications and operations mentioned herein can require or use large data sets. Memory devices that store such data sets can be configured for low latency and high bandwidth and persistence. One problem of a load-store interconnect architecture includes guaranteeing persistence. CXL can help address the problem using an architected flow and standard memory management interface for software, such as can enable movement of persistent memory from a controller-based approach to direct memory management.

One or more memory-based queues may be used between the CPU and the CXL device. The queues are used to exchange commands and responses (e.g., for queue maintenance updates) between applications running on a host processor and a set of processing elements on one or more CXL devices. In an example, the queues can be circular queues with read and write pointers maintained through memory writes. In the case of a command queue, a software agent for the host application can write a series of commands to the queue and then write to a location on a CXL device reflecting the updated state of the queue write index. In response to the write index update, logic in the CXL device can read the commands from the queue.

According to various examples, the network between the CPU and the CXL device does not guarantee ordering for read commands and responses. Thus, the response order for a pair of read requests to addresses A and B may be reversed. For example, a response message or data from the read to address B may return before the data from address A. Operation execution and timing issues can arise in unordered systems, such as including systems that use CXL. Maintaining the order of a command stream issued by a CPU may allow for proper execution of the commands. In an example, a host device can create a series of commands that it queues for execution by an accelerator (e.g., a CXL device). The accelerator can retrieve the commands from the queue and execute the commands in order (e.g., in a first-in-first-out manner).

Examples described herein provide a mechanism to discard redundant queue update messages. Update messages can help maintain a value of a queue write pointer after a command response is written to a host queue. Several of these messages may be available to be sent after a series of responses are written to the host queue. The present inventors have recognized that network traffic can be caused by queue update messages. In an example, traffic can be relieved by discarding all but the latest of the valid update messages.

Examples described herein use memory-based queues through which commands and responses are exchanged. The queues can be circular queues whose read and write pointers are maintained through memory writes. Copies of the queue pointers are maintained by both the producer and consumer interfaces to the queue and are used to determine the state of the queue (i.e. full and/or empty). In the case of the response queue, the CXL device (producer) may write a series of command responses to the queue. To signal to the host (consumer) that a new command has been queued, the CXL device will increment the local copy of the queue write index and will reflect that new index to the host by writing a message to a dedicated host memory location with the value of the queue index. Each message write by the CXL device has an accompanying index update write.

When a command response is written to the host response queue, the CXL device generally waits for a write acknowledgement from the network before generating the memory write to update a host queue write index. This is because the network between the host and the CXL device does not guarantee ordered delivery of writes. If the index update is sent immediately after the command response write then it is possible for the index write to complete before the response write. If this occurs then there is a possibility that the host application agent would see the update and try to read the response before it is written to the queue.

To prevent this race condition, the write index update may pend until reception of a write acknowledgment from the network for the response write. According to various examples, there may be a single outstanding index update write per queue. This can be due to the unordered nature of the network fabric. For example, if write index updates for response A (index n) and response B (index n+1) were sent serially, then the write index for response B might complete before that of response A. This would lead to the loss of the B response (n+1) update since the A response would overwrite it. Examples described herein involve using a reordering buffer to return the command response network write responses to the order in which they were issued.

In some applications, maintaining order allows for optimizing performance and ensuring valid results. For example, operation order enforcement can be important for performing nested loops or matrix computations, where results from earlier operations can be used in later operations. Embodiments described herein allow for reordering the commands to their order of issuance. Some implementations may allow for independent reordering of a stream of commands from each a plurality of host queues (e.g., up to 32 host queues).

Figure 1:
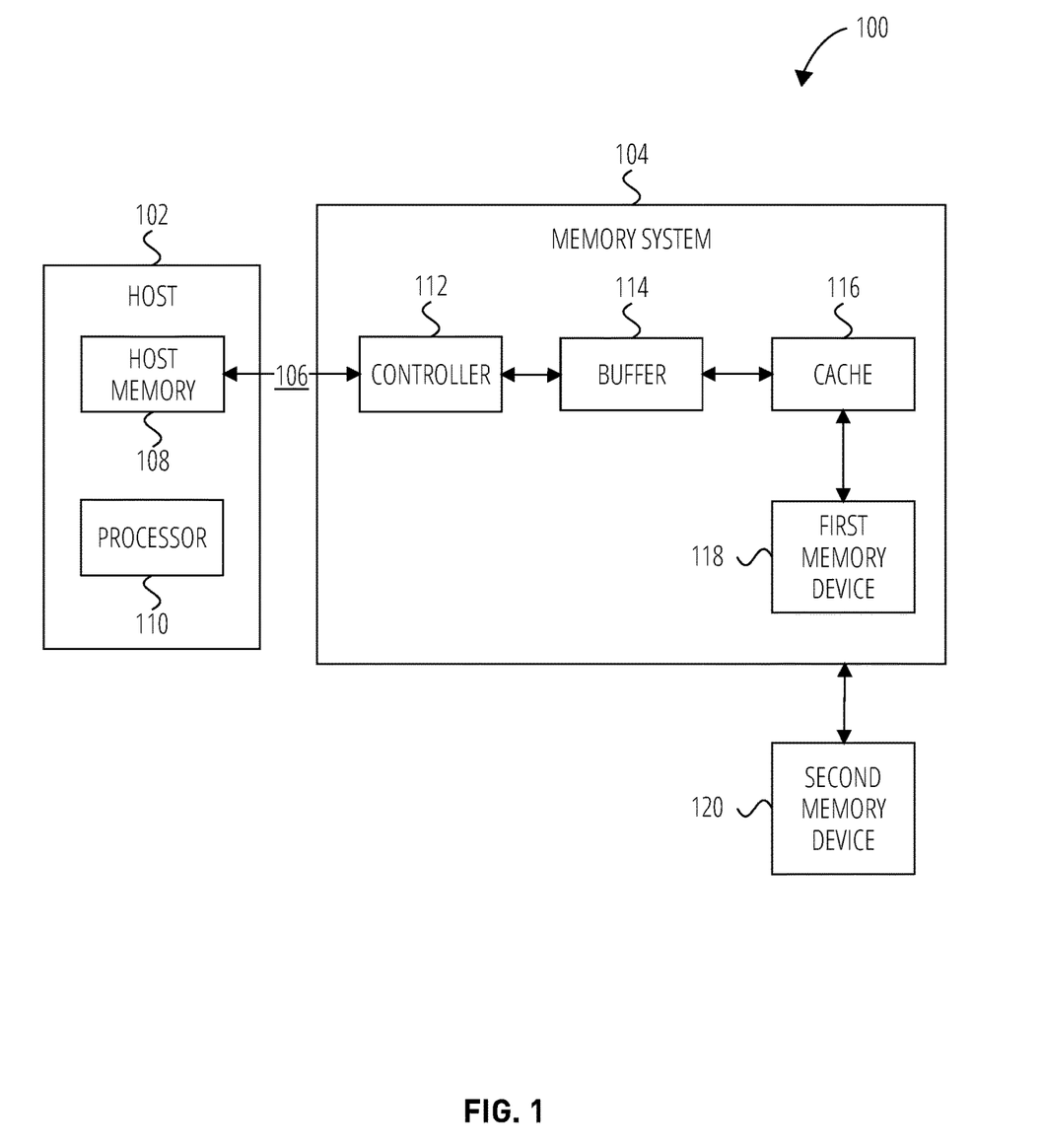
FIG. 1 illustrates generally a block diagram of an example computing system including a host and a memory device.

FIG. 1 illustrates generally a block diagram of an example of a computing system 100 including a host device 102 and a memory system 104. The host device 102 includes a central processing unit (CPU) or processor 110 and a host memory 108. In an example, the host device 102 can include a host system such as a personal laptop computer, a desktop computer, a digital camera, a smart phone, a memory card reader, and/or Internet-of-thing enabled device, among various other types of hosts, and can include a memory access device, e.g., the processor 110. The processor 110 can include one or more processor cores, a system of parallel processors, or other CPU arrangement.

The memory system 104 includes a controller 112, a buffer 114, a cache 116, and a first memory device 118. The first memory device 118 can include, for example, one or more memory modules (e.g., single in-line memory modules, dual in-line memory modules, etc.). The first memory device 118 can include volatile memory and/or non-volatile memory, and can include a multiple-chip device that comprises one or multiple different memory types or modules. In an example, the computing system 100 includes a second memory device 120 that interfaces with the memory system 104 and the host device 102.

The host device 102 can include a system backplane and can include a number of processing resources (e.g., one or more processors, microprocessors, or some other type of controlling circuitry). The computing system 100 can optionally include separate integrated circuits for the host device 102, the memory system 104, the controller 112, the buffer 114, the cache 116, the first memory device 118, the second memory device 120, any one or more of which may comprise respective chiplets that can be connected and used together. In an example, the computing system 100 includes a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In an example, the first memory device 118 can provide a main memory for the computing system 100, or the first memory device 118 can comprise accessory memory or storage for use by the computing system 100. In an example, the first memory device 118 or the second memory device 120 includes one or more arrays of memory cells, e.g., volatile and/or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 118 includes persistent or non-volatile memory, the first memory device 118 can include a flash memory device such as a NAND or NOR flash memory device. The first memory device 118 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

In an example, the controller 112 comprises a media controller such as a non-volatile memory express (NVMe) controller. The controller 112 can be configured to perform operations such as copy, write, read, error correct, etc. for the first memory device 118. In an example, the controller 112 can include purpose-built circuitry and/or instructions to perform various operations. That is, in some embodiments, the controller 112 can include circuitry and/or can be configured to perform instructions to control movement of data and/or addresses associated with data such as among the buffer 114, the cache 116, and/or the first memory device 118 or the second memory device 120.

In an example, at least one of the processor 110 and the controller 112 comprises a command manager (CM) for the memory system 104. The CM can receive, such as from the host device 102, a read command for a particular logic row address in the first memory device 118 or the second memory device 120. In some examples, the CM can determine that the logical row address is associated with a first row based at least in part on a pointer stored in a register of the controller 112. In an example, the CM can receive, from the host device 102, a write command for a logical row address, and the write command can be associated with second data. In some examples, the CM can be configured to issue, to non-volatile memory and between issuing the read command and the write command, an access command associated with the first memory device 118 or the second memory device 120. In some examples, the CM can issue, to the non-volatile memory and between issuing the read command and the write command, an access command associated with the first memory device 118 or the second memory device 120.

In an example, the buffer 114 comprises a data buffer circuit that includes a region of a physical memory used to temporarily store data, for example, while the data is moved from one place to another. The buffer 114 can include a first-in, first-out (FIFO) buffer in which the oldest (e.g., first-in) data is processed first. In some embodiments, the buffer 114 includes a hardware shift register, a circular buffer, or a list.

In an example, the cache 116 comprises a region of a physical memory used to temporarily store particular data that is likely to be used again. The cache 116 can include a pool of data entries. In some examples, the cache 116 can be configured to operate according to a write-back policy in which data is written to the cache without the being concurrently written to the first memory device 118. Accordingly, in some embodiments, data written to the cache 116 may not have a corresponding data entry in the first memory device 118.

In an example, the controller 112 can receive write requests involving the cache 116 and cause data associated with each of the write requests to be written to the cache 116. In some examples, the controller 112 can receive the write requests at a rate of thirty-two (32) gigatransfers (GT) per second, such as according to or using a CXL protocol. The controller 112 can similarly receive read requests and cause data stored in, e.g., the first memory device 118 or the second memory device 120, to be retrieved and written to, for example, the host device 102 via the interface 106.

In an example, the interface 106 can include any type of communication path, bus, or the like that allows for information to be transferred between the host device 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. In an example, the interface 106 includes a PCIe 5.0 interface that is compliant with the compute express link (CXL) protocol standard. Accordingly, in some embodiments, the interface 106 supports transfer speeds of at least 32 GT/s.

As similarly described elsewhere herein, CXL is a high-speed central processing unit (CPU)-to-device and CPU-to-memory interconnect designed to enhance compute performance. CXL technology maintains memory coherency between the CPU memory space (e.g., the host memory 108) and memory on attached devices or accelerators (e.g., the first memory device 118 or the second memory device 120), which allows resource sharing for higher performance, reduced software stack complexity, and lower overall system cost. CXL is designed to be an industry open standard interface for high-speed communications as accelerators are increasingly used to complement CPUs in support of emerging data-rich and compute-intensive applications such as artificial intelligence and machine learning.

Figure 2:
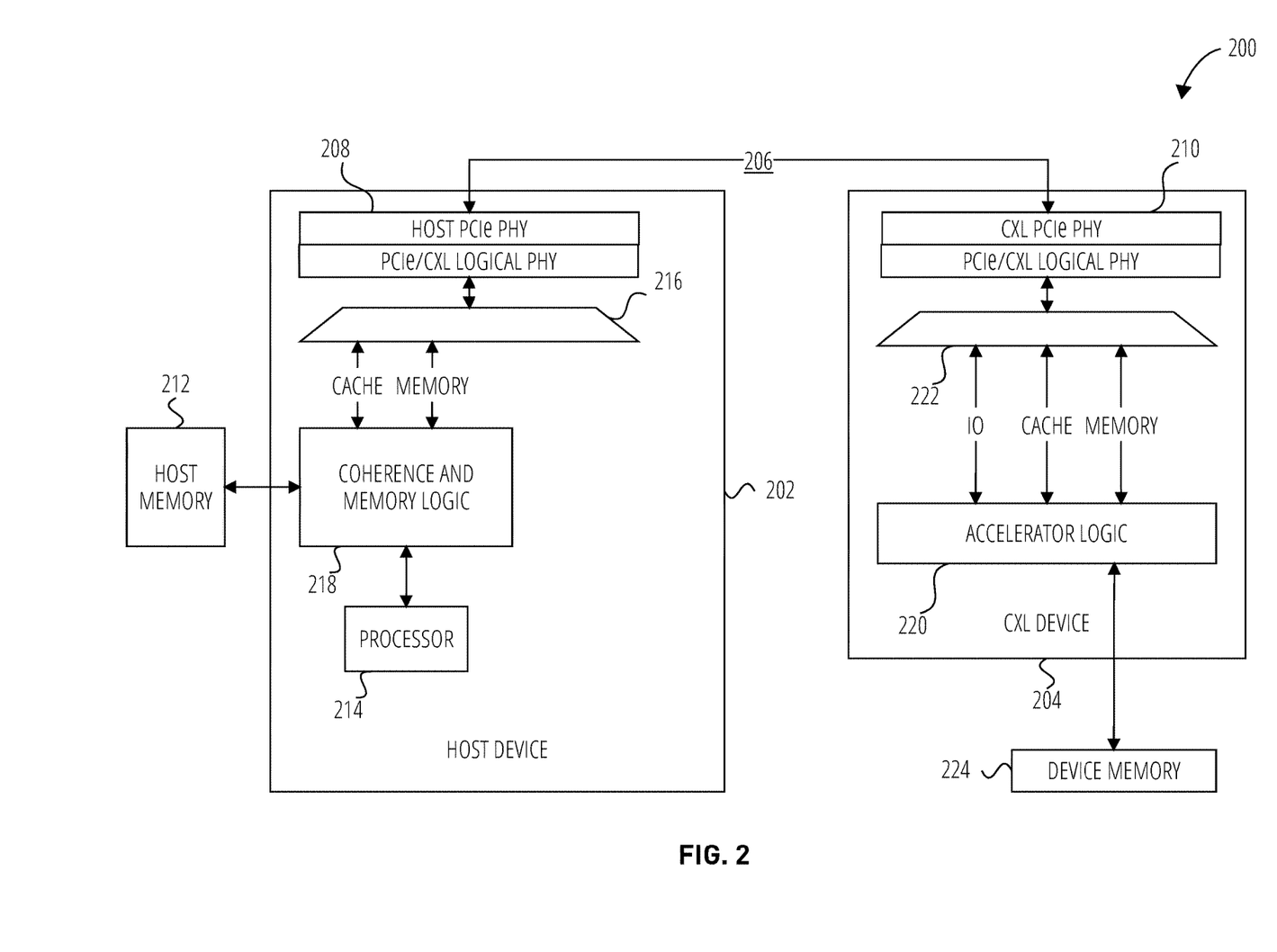
FIG. 2 illustrates generally an example of a CXL system that uses a CXL link to connect a host device and a CXL device.

FIG. 2 illustrates generally an example of a CXL system 200 that uses a CXL link 206 to connect a host device 202 and a CXL device 204. In an example, the host device 202 comprises or corresponds to the host device 102 and the CXL device 204 comprises or corresponds to the memory system 104 from the example of the computing system 100 in FIG. 1. A memory system command manager can comprise a portion of the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s). The host device 202 can comprise, or can be coupled to, host memory 212. The host device 202 can include various circuitry or logic configured to facilitate CXL-based communications and transactions with the CXL device 204. For example, the host device 202 can include coherence and memory logic 218 configured to implement transactions according to CXL.cache and CXL.mem semantics, and the host device 202 can include PCIe logic 220 configured to implement transactions according to CXL.io semantics. In an example, the host device 202 can be configured to manage coherency of data cached at the CXL device 204 using, e.g., its coherence and memory logic 218.

The host device 202 can further include a host multiplexer 216 configured to modulate communications over the CXL link 206 (e.g., using the PCIe PHY layer 208, 210). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures may use different solutions, which in turn can compromise backward compatibility. CXL can address this problem by consolidating the coherency function at the host device 202, such as using the coherence and memory logic 218.

The CXL device 204 can include an accelerator device that comprises various accelerator logic 220. In an example, the CXL device 204 can comprise, or can be coupled to, CXL device memory 224. The CXL device 204 can include various circuitry or logic configured to facilitate CXL-based communications and transactions with the host device 202 using the CXL link 206. For example, the accelerator logic 220 can be configured to implement transactions according to CXL.cache, CXL.mem, and CXL.io semantics. The CXL device 204 can include a CXL device multiplexer 222 configured to control communications over the CXL link 206.

In an example, the accelerator logic 220 comprises a Unified Assist Engine (UAE) or compute fabric with various functional units such as a command manager (CM), Threading Engine (TE), Streaming Engine (SE), Data Manager or data mover (DM), or other unit. The compute fabric can be reconfigurable and can include separate synchronous and asynchronous flows.

The accelerator logic 220 or portions thereof can be configured to operate in an application space of the CXL system 200 and, in some examples, can initiate its own threads or sub-threads, which can operate in parallel and can optionally use resources or units on other CXL devices 204. Queue and transaction control through the system can be coordinated by the CM, TE, SE, or DM components of the UAE. In an example, each queue or thread can map to a different loop iteration to thereby support multi-dimensional loops. With the capability to initiate such nested loops, among other capabilities, the system can realize significant time savings and latency improvements for compute-intensive operations.

Figure 3:
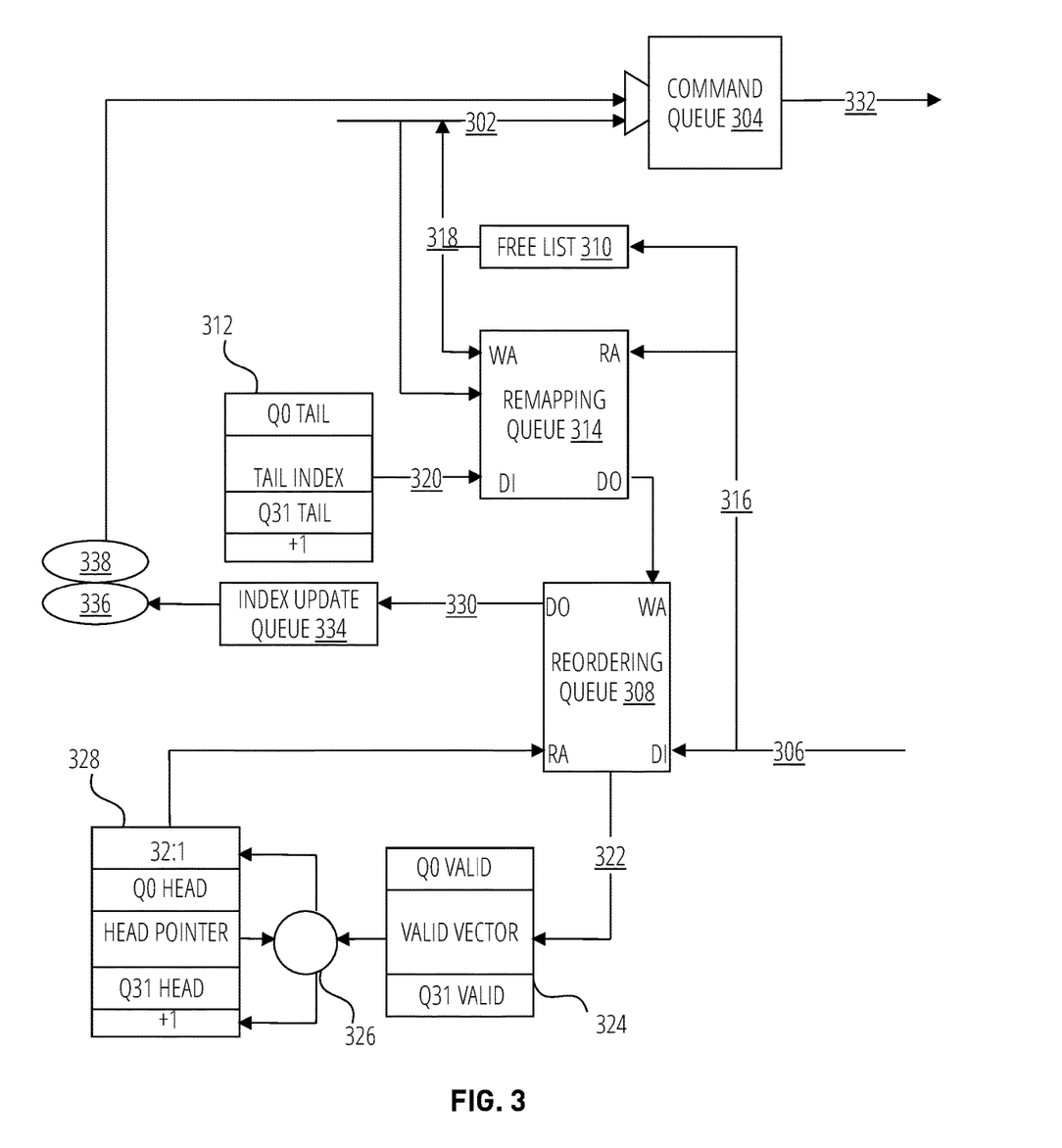
FIG. 3 illustrates a system for reordering host commands between the host processor and the CXL device.

FIG. 3 illustrates an example of a system and information or processing flow for reducing the number of index update writes that are sent to the host system, in accordance with examples described herein. In the example, a command is received 302 at a command queue 304 from the CM. The command is transmitted 332 to the network between the host processor and the CXL device. The command is written to a host command queue. An additional write to the host is performed to update the host queue write pointer for the entry just written. A network response to the command is received 306 at a reordering queue 308. A value of the updated host queue write index for the command response may be written to the reordering queue 308. According to some examples, a reordering queue 308 per host command queue is used to receive 306 responses from the network.

In an example, each of the commands can be associated with a Transaction Identifier (TID), such as can be used by the network. The TID may be referred to herein as a network write request ID and/or an ID. In an example, a free list index from the free list 310 may be used as the TID and may be received 306 with the command response from the network. When the TID is allocated from the free list as the command is received 302, it is used to write 320 the tail index of the reordering queue segment to the remapping queue 314. When the command response is received 306 the TID is used to read 316 the remapping queue to retrieve the reordering queue 308 write pointer for the response.

When the command is received 302, a reorder queue entry can be allocated in the reordering queue 308. The reorder queue entry can correspond to a tail index entry from a tail index table 312. The value of the tail index from the tail index table can be determined by the host queue ID of the command. The tail index can be associated with a particular write address of the reordering queue 308.

In this example, each of the reordering queue 308 and remapping queue 314 can be configured to receive a read address, RA, a data input, DI, a write address, WA, an incoming data in, DI, and can be configured to provide an outgoing data output, DO. The reordering queue is organized as a collection of logical circular queues. Each circular queue is associated with a host queue ID that is specified by the command. In this example the number of logical queue segments within the reordering queue is 32. It is to be understood that logical queue segments herein may be described as queues and/or segments.

According to various embodiments, an entry from a free list 310 can be allocated. The free list 310 can include a list of indices or buffer pointers that can be available for allocation. The free list index of the allocated free list 310 entry may be used to access 318 a remapping queue 314. When a free list entry is allocated a corresponding entry in a remapping queue 314 is written with the tail index of the reordering queue associated with the request host queue ID.

The remapping queue 314 returns the reordering queue tail index that was assigned when the command was sent. The tail index that was returned by the remapping queue 314 provides the write address for the response to be written to the reordering queue 308. When the response is written to the reordering queue, the ID is returned to the free list 310 and the remapping queue entry is freed.

In response to allocating a reordering queue entry, the tail index for the selected reordering queue segment is incremented to point to the next entry in the reordering queue 308. An immediately subsequent read request may be associated with the next entry in the reordering queue 308.

According to various examples, each host queue is associated with an index update queue 334. An entry at the head of the index update queue 334 may be used to build network write index update messages. The index update queues 334 for respective different host queues may arbitrate to send their respective update messages. Since each host queue can have only a single index update message outstanding, a particular index update queue 334 may wait for the network write response for the current index update to be received before re-entering arbitration to send the next update.

While waiting for the write acknowledgement from the network, it is possible that multiple command responses for a particular host queue have exited 330 the reordering queue 308 resulting in multiple write index updates pending in the index update queue 334 for that host queue. Since each of the command responses is retired in order, their associated index updates are stored in the index update queue 334 in ascending monotonic order.

Another process can be used to determine when an entry may be removed from the reordering queue 308. According to various embodiments, one valid vector 324 per host queue can be used. The width of the valid vector 324 may be set to the number of entries in the reordering queue 308 segment. When a read response is written to the reordering queue 308, the valid bit in the vector corresponding to that reorder queue entry is set 322.

Each reordering queue 308 segment can have a respective head pointer from a head pointer table 328. In an example, the head pointer is an index associated with the reordering queue 308 and it corresponds to a next in-order entry to be read from the reordering queue 308 segment.

Both of the valid vector 324 and the head pointer of the reordering queue 308 can be used to determine when an entry may be removed from the reordering queue 308. For example, if the bit in the valid vector 324 corresponding to the value of the current head pointer is set, then that entry can be known to contain the next write response in issue order. That write response can then be read from the reordering queue 308. When an entry is read from the reordering queue 308, the head pointer is incremented and the corresponding bit in the valid vector 324 is cleared. An arbitration processor 326 uses the valid bits to determine if any packets are ready to send to the index update queue 334. The arbitration processor 326 may do this by determining if the valid bit is set for an entry corresponding to the head pointer position in the reordering queue 308. Once the reordered read response is removed from the reordering queue the reordering queue entry is freed.

The index update queue 334 is organized as a set of logical circular queues. For example, the index update queue 334 may be organized as a set of 32 logical circular queues. Each queue has a tail pointer and a head pointer. New entries are written to the tail pointer. The head pointer is used to read entries from the queue. When the current index update completes and the index update queue 334 is allowed to send another update, it will check to see how many entries are valid in the index update queue 334 for each host command queue. If a single entry is valid, then a new write index update message is built using the write index stored in the index update queue 334. If more than one entry is valid in the index update queue 334, then all but the last valid entry in the index update queue 334 may be discarded 336. This is because the responses were retired in order and the indices stored in the index update queue are contiguous and montonically increasing. The entries between the current head of the index update queue 334 and the tail are all valid but only the tail entry is sent since it corresponds to the last response write that has completed. The index in the last entry is used to build 338 the network write index update message and the rest of the entries are discarded by a pop and drop module 336. The reduction of the number of index write updates using the systems and methods described herein may reduce network and host memory bandwidth when compared to traditional approaches.

Figure 4:
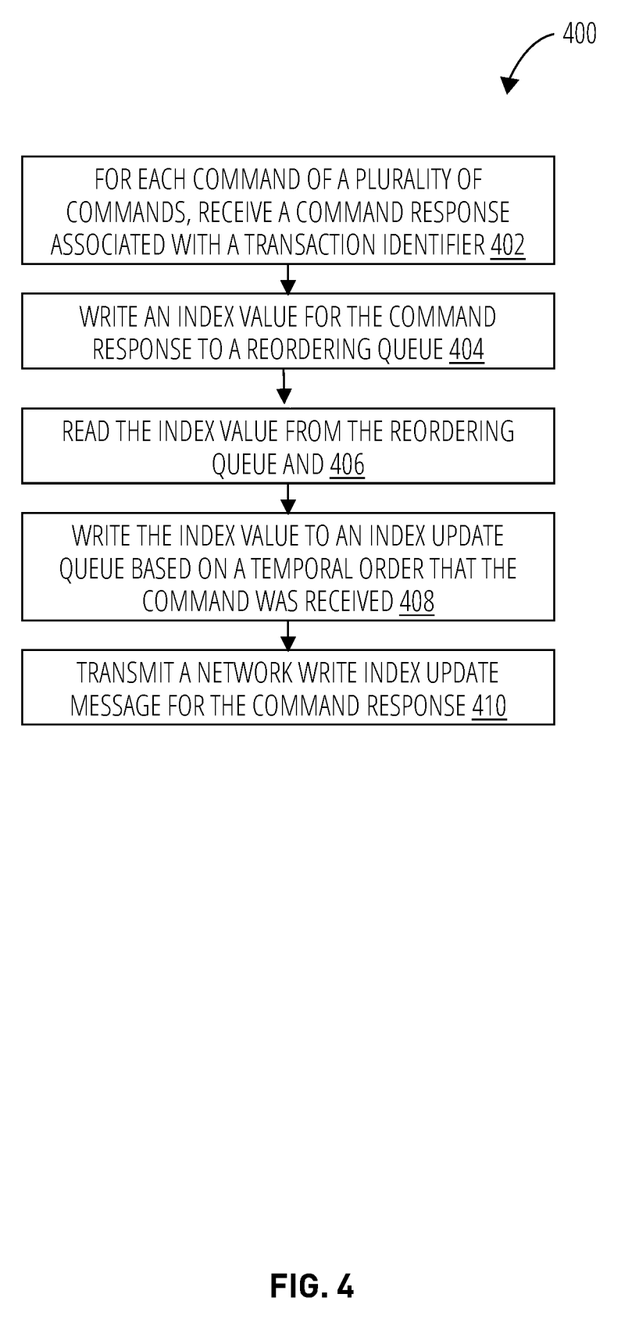
FIG. 4 illustrates a routine 400 in accordance with one embodiment.

FIG. 4 illustrates a process for reducing the number of index update writes that are sent to the host system in accordance with examples described herein. In block 402, routine 400 includes receiving a command response associated with a transaction identifier for each command of a plurality of commands.

In block 404, routine 400 writes an index value for the command response to a reordering queue. According to various examples, a free list entry for the command is allocated from a free list. The free list entry may be associated with the transaction identifier of the command. The allocated free list entry is used to access a remapping queue. The remapping queue provides the write address for the command response to be written to the reordering queue.

In block 406, routine 400 reads the index value from the reordering queue in response to a command response write for the command response. In block 408, routine 400 writes the index value to an index update queue based on a temporal order that the command was received. The index update queue may be a FIFO queue, for example. A valid bit for the index value may be set in response to writing the index value to the index update queue.

In block 410, routine 400 transmits a network write index update message for the command response. A number of entries in the index update queue that have the valid bit set may be determined in response to transmitting the index update message. A new index update message corresponding to the one entry in the index update queue may be transmitted in response to determining that one entry in the index update queue has the valid bit set. In response to determining that more than one entry in the index update queue has the valid bit set, a new index update message corresponding to a valid tail entry of the index update queue may be transmitted. In some cases, all of the index update values except for the tail value may be discarded.

Figure 5:
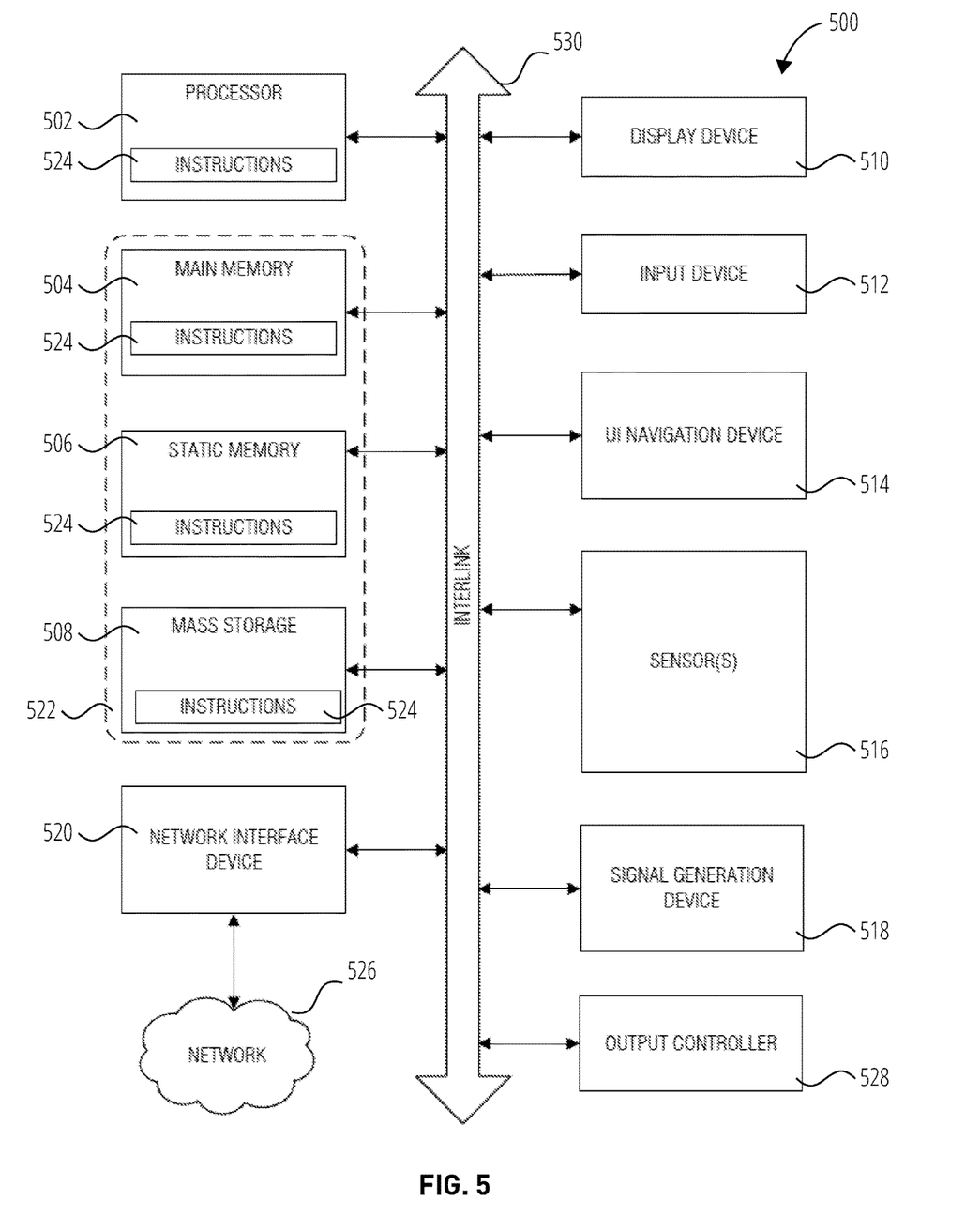
FIG. 5 illustrates a block diagram of an example machine with which, in which, or by which any one or more of the techniques discussed herein can be implemented.

FIG. 5 illustrates a block diagram of an example machine 500 with which, in which, or by which any one or more of the techniques (e.g., methodologies) discussed herein can be implemented. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 500 (e.g., computer system) can include a hardware processor 502 or host device (e.g., the host device, a central processing unit (CPU), a graphics processing unit (GPU), a hardware processor core, or any combination thereof), a main memory 504, a static memory 506 (e.g., memory or storage for firmware, microcode, a basic-input-output (BIOS), unified extensible firmware interface (UEFI), etc.), and mass storage device 508 or memory die stack, hard drives, tape drives, flash storage, or other block devices) some or all of which can communicate with each other via an interlink 530 (e.g., bus). The machine 500 can further include a display device 510, an alphanumeric input device 512 (e.g., a keyboard), and a user interface (UI) Navigation device 514 (e.g., a mouse). In an example, the display device 510, the input device 512, and the UI navigation device 514 can be a touch screen display. The machine 500 can additionally include a mass storage device 508 (e.g., a drive unit), a signal generation device 518 (e.g., a speaker), a network interface device 520, and one or more sensor(s) 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 502, the main memory 504, the static memory 506, or the mass storage device 508 can be, or include, a machine-readable media 522 on which is stored one or more sets of data structures or instructions 524 (e.g., software) embodying or used by any one or more of the techniques or functions described herein. The instructions 524 can also reside, completely or at least partially, within any of registers of the hardware processor 502, the main memory 504, the static memory 506, or the mass storage device 508 during execution thereof by the machine 500. In an example, one or any combination of the hardware processor 502, the main memory 504, the static memory 506, or the mass storage device 508 can constitute the machine-readable media 522. While the machine-readable media 522 is illustrated as a single medium, the term "machine-readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 522 can be representative of the instructions 524, such as instructions 524 themselves or a format from which the instructions 524 can be derived. This format from which the instructions 524 can be derived can include source code, encoded instructions (e.g., in compressed or encrypted form), packaged instructions (e.g., split into multiple packages), or the like. The information representative of the instructions 524 in the machine-readable media 522 can be processed by processing circuitry into the instructions to implement any of the operations discussed herein. For example, deriving the instructions 524 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 can include assembly, compilation, or interpretation of the information (e.g., by the processing circuitry) to create the instructions 524 from some intermediate or preprocessed format provided by the machine-readable media 522. The information, when provided in multiple parts, can be combined, unpacked, and modified to create the instructions 524. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 can include or use subject matter such as a system comprising:
a host device;
a memory device; and
a command manager configured to reorder respective command responses for corresponding commands between the host device and the memory device, the command manager is further configured to:
receive a command response associated with a transaction identifier for each command;
write an index value for the command to a reordering queue; and
in response to a command response write for the command response:
read the index value from the reordering queue;
write the index value in an index update queue; and
transmit a network write index update message.

Example 2 can include or use, or can optionally be combined with the subject matter of Example 1, to optionally include, that the host device is coupled to the memory device using a compute express link (CXL) interconnect.

Example 3 can include or use, or can optionally be combined with the subject matter of any of examples 1 or 2 to optionally include that the reordering queue is a set of circular reordering queues.

Example 4 can include or use, or can optionally be combined with the subject matter of any of examples 1-3 to optionally include that the reordering queue is a set of 32 circular reordering queues.

Example 5 can include or use, or can optionally be combined with the subject matter of any of examples 1-4 to optionally include that the index update queue is a set of circular index update queues.

Example 6 can include or use, or can optionally be combined with the subject matter of any of examples 1-5 to optionally include that the index update queue is a set of 32 circular index update queues.

Example 7 can include or use, or can optionally be combined with the subject matter of any of examples 1-6 to optionally include that the command manager is further configured to reorder command responses to an order in which the commands were issued using the reordering queue.

Example 8 can include or use, or can optionally be combined with the subject matter of any of examples 1-7 to optionally include that the index update queue is configured to store index values in an order in which the associated commands were issued.

Example 9 can include or use, or can optionally be combined with the subject matter of any of examples 1-8 to optionally include that the command manager is further configured to allocate a free list entry for the command from a free list, the free list entry associated with the transaction identifier of the command.

Example 10 can include or use, or can optionally be combined with the subject matter of any of examples 1-9 to optionally include that in response to writing the index value to the index update queue, the command manager is configured to set a valid bit corresponding to the index update queue entry.

Example 11 can include or use, or can optionally be combined with the subject matter of any of examples 1-10 to optionally include that the command manager is further configured to transmit index update messages one at a time.

Example 12 can include or use subject matter such as a method comprising:
for each command of a plurality of commands, receiving a command response associated with a transaction identifier;
writing an index value for the command response to a reordering queue; and
in response to a command response write for the command response:
reading the index value from the reordering queue;
writing the index value to an index update queue based on a temporal order that the command response was received; and
transmitting a network write index update message for the command response.

Example 13 can include or use, or can optionally be combined with the subject matter of any of example 12 to optionally include that the index update queue is a set of 32 circular index update queues.

Example 14 can include or use, or can optionally be combined with the subject matter of any of examples 12 or 13 to optionally include that the index update queue is configured to store index values in an order in which the associated commands were issued.

Example 15 can include or use, or can optionally be combined with the subject matter of any of examples 12-14 to optionally include allocating a free list entry for the command from a free list, the free list entry associated with the transaction identifier of the command.

Example 16 can include or use, or can optionally be combined with the subject matter of any of examples 12-15 to optionally include that in response to writing the index value to the index update queue, setting a valid bit corresponding to the index update queue entry.

Example 17 can include or use, or can optionally be combined with the subject matter of example 16 to optionally include in response to setting the valid bit for the index update queue entry, determining a number of entries in the index update queue have the valid bit set.

Example 18 can include or use, or can optionally be combined with the subject matter of example 17 to optionally include in response to determining that one entry in the index update queue has the valid bit set, transmitting a new index update message corresponding to the one entry in the index update queue.

Example 19 can include or use, or can optionally be combined with the subject matter of example 17 to optionally include:
   in response to determining that more than one entry in the index update queue has the valid bit set:
   transmitting a new index update message corresponding to a valid tail entry of the index update queue; and
   discarding the remaining valid entries in the index update queue.

Example 20 can include or use subject matter such as at least one non-transitory machine-readable storage medium comprising instructions that, when executed by a processor circuit of a memory system, cause the processor circuit to perform operations comprising:
   for each command of a plurality of commands, receiving a command response associated with a transaction identifier;
   writing an index value for the command response to a reordering queue; and
   in response to a command response write for the command response:
      reading the index value from the reordering queue and;
      writing the index value to an index update queue based on a temporal order that the command response was received; and
      transmitting a network write index update message for the command response.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system, comprising:
   a host device;
   a memory device; and
   a command manager configured to reorder respective command responses for corresponding commands between the host device and the memory device, the command manager is further configured to:
      receive a command response associated with a transaction identifier for each command;
      write an index value for the command to a reordering queue; and
      in response to a command response write for the command response:
         read the index value from the reordering queue;
         write the index value to an index update queue; and
         transmit a network write index update message.

2. The system of claim 1, wherein the host device is coupled to the memory device using a compute express link (CXL) interconnect.

3. The system of claim 1, wherein the reordering queue is a set of circular reordering queues.

4. The system of claim 1, wherein the reordering queue is a set of 32 circular reordering queues.

5. The system of claim 1, wherein the index update queue is a set of circular index update queues.

6. The system of claim 1, wherein the index update queue is a set of 32 circular index update queues.

7. The system of claim 1, wherein the command manager is further configured to reorder command responses to an order in which the commands were issued using the reordering queue.

8. The system of claim 1, wherein the index update queue is configured to store index values in an order in which the associated commands were issued.

9. The system of claim 1, wherein the command manager is further configured to allocate a free list entry for the command from a free list, the free list entry associated with the transaction identifier of the command.

10. The system of claim 1, wherein in response to writing the index value to the index update queue, the command manager is configured to set a valid bit corresponding to a corresponding index update queue entry.

11. The system of claim 1, wherein the command manager is further configured to transmit index update messages one at a time.

12. A method, comprising:
for each command of a plurality of commands, receiving a command response associated with a transaction identifier;
writing an index value for the command response to a reordering queue; and
in response to a command response write for the command response:
reading the index value from the reordering queue;
writing the index value to an index update queue based on a temporal order that the command response was received; and
transmitting a network write index update message for the command response.

13. The method of claim 12, wherein the index update queue is a set of 32 circular queues.

14. The method of claim 12, wherein the index update queue is configured to store index values in an order in which the associated commands were issued.

15. The method of claim 12, further comprising allocating a free list entry for the command from a free list, the free list entry associated with the transaction identifier of the command.

16. The method of claim 12, further comprising in response to writing the index value to the index update queue setting a valid bit for a corresponding index update queue entry.

17. The method of claim 16, further comprising in response to setting the valid bit for the index update queue entry, determining a number of entries in the index update queue that have the valid bit set.

18. The method of claim 17, in response to determining that one entry in the index update queue has the valid bit set, transmitting a new index update message corresponding to the one entry in the index update queue.

19. The method of claim 17, in response to determining that more than one entry in the index update queue has the valid bit set:
transmitting a new index update message corresponding to a valid tail entry of the index update queue; and
discarding remaining valid entries in the index update queue.

20. At least one non-transitory machine-readable storage medium comprising instructions that, when executed by a processor circuit of a memory system, cause the processor circuit to perform operations comprising:
for each command of a plurality of commands, receiving a command response associated with a transaction identifier;
writing an index value for the command response to a reordering queue; and
in response to a command response write for the command response:
reading the index value from the reordering queue and;
writing the index value to an index update queue based on a temporal order that the command response was received; and
transmitting a network write index update message for the command response.

* * * * *